Aug. 17, 1943.                T. R. HARRISON                2,326,853
                        MEASURING AND CONTROL APPARATUS
                  Original Filed Sept. 4, 1937        2 Sheets-Sheet 1
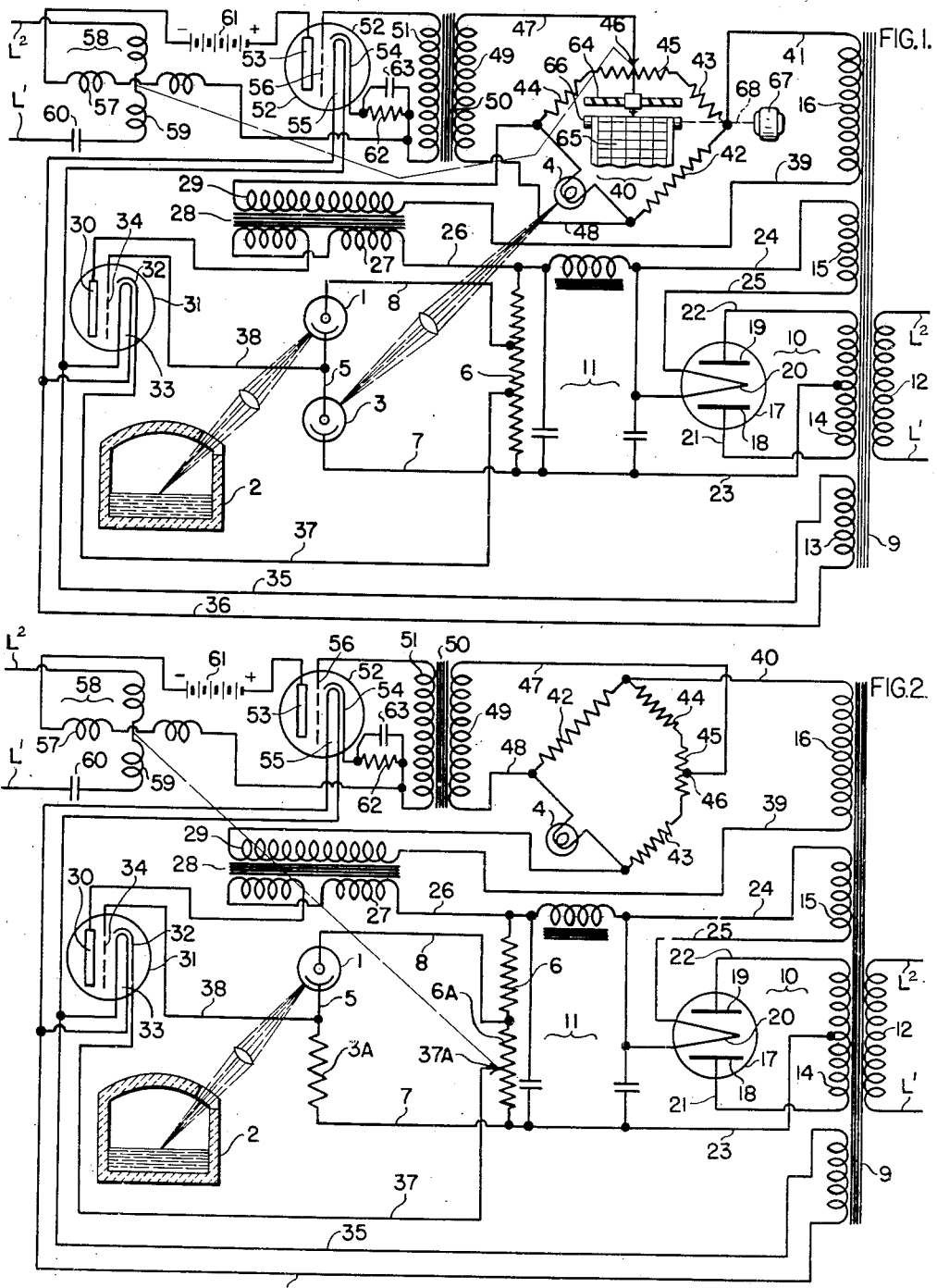
INVENTOR.
THOMAS R. HARRISON
BY E. B. Spangenberg
ATTORNEY

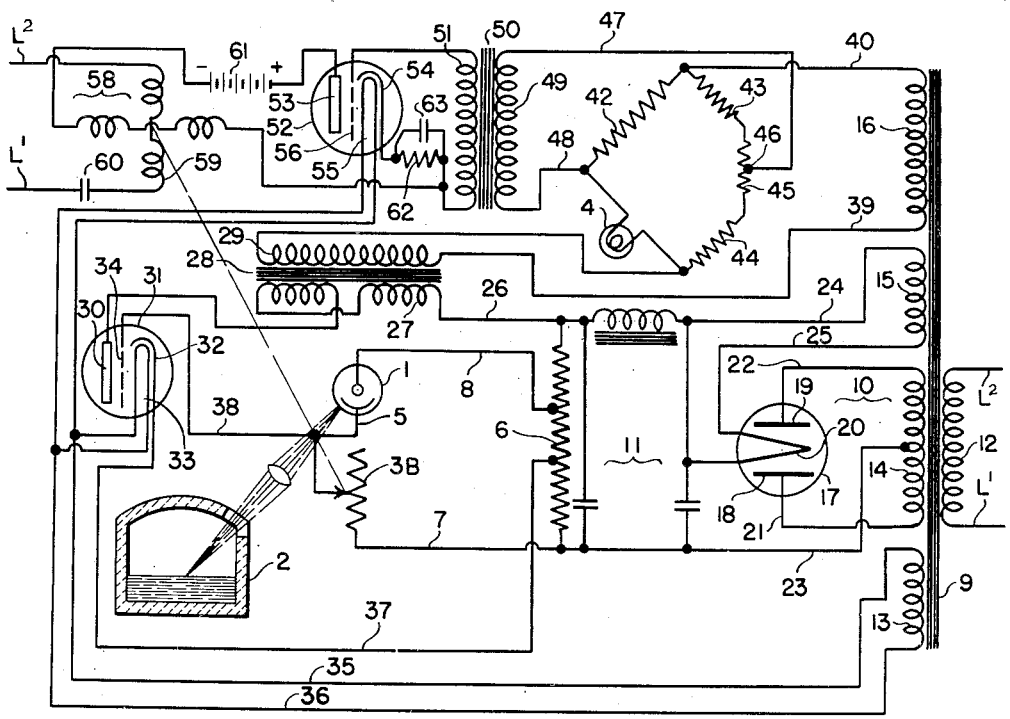

Patented Aug. 17, 1943

2,326,853

UNITED STATES PATENT OFFICE 2,326,853

MEASURING AND CONTROL APPARATUS

Thomas R. Harrison, Wyncote, Pa., assignor to The Brown Instrument Company, Philadelphia, Pa., a corporation of Pennsylvania Original application September 4, 1937, Serial No. 162,474. Divided and this application December 19, 1940, Serial No. 370,815

27 Claims. (Cl. 88—23)

The present invention is a division of my prior application, Serial No. 162,474, filed September 4, 1937 (Patent No. 2,245,033, issued June 10, 1941) for measuring apparatus which discloses various arrangements, including those illustrated and described herein, for recording and/or controlling temperature variations in incandescent bodies.

An object of the present invention is to provide radiant energy responsive apparatus for ascertaining and continuously recording and/or controlling temperature variations in incandescent bodies.

Another object of the present invention is to provide apparatus of the type referred to above, which is characterized by being extremely fast in response and self balancing.

A special object of the present invention is to provide high speed temperature measuring and recording apparatus in which a light sensitive device may be employed as the condition responsive element, and in which delicate electrical current measuring instruments, such, for example, as microammeters or milliammeters are not required nor employed.

In measuring and recording temperature variations in incandescent bodies it is relatively important in certain applications that the apparatus employed be capable of responding to and recording the variations in a minimum of time. For example, if an accurate record is desired of the variations in temperature throughout their length of successive pieces of material such as bars or billets passing in process through a steel mill, it is of especial importance that the measuring apparatus be capable of a high speed of response. The practicability of employing light sensitive devices or photoelectric cells in making such measurements is readily apparent, since, as is well known, photoelectric cells are characterized by their extreme rapidity of response to variations in light intensity and pass an electric current which bears a definite relation to the temperature of the body from which the light emanates.

Various high speed radiant energy responsive systems utilizing a light sensitive device as the condition-responsive element have heretofore been proposed for measuring and recording temperature variations in incandescent bodies, but all of the proposed systems have been of a deflectional type employing a delicate electrical current measuring instrument and a scale or chart with which the deflecting member or pointer of the instrument is adapated to cooperate. In the proposed systems the radiant light from an incandescent body is ordinarily directed on a photoelectric cell and the electric current passed by the cell is measured by a suitably calibrated electrical current measuring instrument. In some instances, the current passed by the photoelectric cell is first amplified by some form of electronic amplifier and the amplified quantity is measured by a similarly calibrated electrical current measuring instrument. As is apparent the position of the deflecting member or pointer of the instrument relative to the scale thereof will provide a measure of the temperature of the incandescent body, and, if a record is desired, suitable apparatus may be arranged in cooperative relation with the instrument pointer to periodically record its position on a chart or a pen may be mounted directly on the instrument pointer and arranged to cooperate with a chart to thereby provide a continuous record of the temperature variations. Since the only time lag in recording by the last mentioned method is that required for the instrument pointer to swing up scale, this method has proved to be the most desirable of the prior art devices adapted for utilizing to advantage the high speed of response of the light sensitive elements.

As is well known, however, deflectional measuring instruments are undesirable in many respects for making precision measurements. For example, the calibration of a deflectional measuring instrument is dependent upon the constancy of magnets, springs, jewel bearings, and the level of the instrument, all of which are affected and changed to varying extents by many factors such, for example, as temperature, age, and vibration. Such instruments, furthermore, are limited in respect to the available torque for recording or controlling purposes making necessary the use of narrow and therefore undesirable charts and unsatisfactory control instrumentalities. Such instruments, furthermore, embody charts having non-rectangular coordinates which are undesirable and ordinarily the periodicity of response necessarily employed results in sluggish response thereof to small departures.

The above objections have been avoided in the apparatus disclosed and claimed in the present application by providing a self balancing electrical bridge network especially adapted to be used with the radiant energy responsive apparatus for recording the measured variations in a minimum of time. In one embodiment of the invention, a photoelectric cell, responsive to the radiant light emanating from an incandescent body whose temperature is to be measured, is employed to control the bridge network balance and a reversible electrical motor is arranged to be selectively controlled in response to bridge network unbalance by means including saturating reactor means responsive to the condition of balance of said network so that the motor will remain stationary or will be energized for rotation in one direction or the other as the temperature of the incandescent body rises above or falls below a predetermined value. The motor shaft is preferably connected in any convenient manner to the bridge rebalancing contact so that energization of the motor is employed to effect movement of the rebalancing contact in the proper direction to rebalance the bridge network. As is apparent, the new position of the rebalancing contact will provide a measure of the temperature of the incandescent body and, if desired, a pen may be mounted on the carrier of the rebalancing contact and arranged to cooperate with a suitably calibrated record chart for recording the temperature variations.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described preferred embodiments of the invention.

Of the drawings:

Fig. 1 is a diagrammatic view illustrating an embodiment of the invention as adapted for use in measuring and recording the temperature variations of an incandescent body;

Figs. 2 and 3 illustrate modifications of the arrangement disclosed in Fig. 1; and Fig. 4 is a diagrammatic view illustrating the use of my invention in a control system.

In Fig. 1 of the drawings a photoelectric pyrometer is illustrated in which a photoelectric cell 1 is arranged to receive light from the interior of a furnace 2 and a second photoelectric cell 3 is arranged to receive light from a lamp 4 the illumination of which is adapted to be controlled by means responsive to the relative illuminations of the two photoelectric cells. The photoelectric cells are arranged in an electrically balanced circuit and as the temperature of the incandescent material within the furnace varies the illumination of lamp 4 is varied until the illumination of the two photoelectric cells is again balanced. It will be apparent that the magnitude of the lamp energizing current will then be a measure of the temperature of the incandescent material in the furnace 2.

As shown, the two photoelectric cells 1 and 3 are connected in series relation by a conductor 5 and the series arrangement is connected across a suitable portion of a voltage divider 6 by conductors 7 and 8. The photoelectric cell 1 is preferably so arranged that the only light which impinges on the cell is that which is to be measured. Desirably the photoelectric cell 3 is also arranged so that it is subject only to light from the lamp 4.

The voltage divider 6 is energized from alternating current supply conductors $L^1$ and $L^2$ through a transformer 9, a full wave rectifier 10 and a filter 11. The transformer 9 is a combination step-up and step-down transformer and comprises a line voltage primary winding 12 which is connected to the supply conductors $L^1$ and $L^2$, and secondary windings 13, 14, 15 and 16.

As illustrated, the full wave rectifier 10 comprises a rectifier valve 17 having anodes 18 and 19 and a filament type cathode 20. The anodes 18 and 19 are connected by conductors 21 and 22 with the terminals of the secondary winding 14. A center tap on the secondary winding 14 is connected by a conductor 23 to one input terminal of the filter 11 and the other input terminal of the latter is connected to the cathode 20 of the valve 17. The output terminals of the filter are connected to opposite ends of the voltage divider 6 so that a steady direct current voltage is maintained across the voltage divider. Due to the filtering action of the filter this direct current voltage is substantially free from alternating components. As shown, the cathode 20 of the rectifier valve 17 receives energizing current through conductors 24 and 25 from the transformer secondary winding 15.

The cathode of the photoelectric cell 3 is connected to one end of the voltage divider 6 by the conductor 7 and the anode of the photoelectric cell 1 is connected to a point intermediate the ends of the voltage divider. The other end of the voltage divider is connected by a conductor 26, in which the direct current winding 27 of a saturating reactor 28 having an alternating current winding 29 is inserted, to the anode 30 of an electronic valve 31. The electronic valve 31 is a heater type triode and includes the anode 30, a cathode 32, a heater filament 33 and a control grid 34. The heater filament 33 receives energizing current from the transformer secondary winding 13 through conductors 35 and 36. The cathode 32 is connected by a conductor 37 to a point on the voltage divider 6 between the points of connection of conductors 7 and 8 thereto, and the control grid 34 is connected by a conductor 38 to the conductor 5 between the two photoelectric cells.

The windings 27 and 29 of the saturating reactor 28 are wound on a saturable core the saturation of which is controlled in accordance with the current flow through the direct current winding 27. When the direct current winding is deenergized the alternating current winding 29 presents a relatively high impedance to the flow of alternating current therethrough but as the current flow through the direct current winding 27 is increased the magnetic saturation of the core is increased, and due to this action, the effective resistance of the alternating current winding 29 is decreased to a corresponding extent.

One end of the transformer secondary winding 16 is connected by a conductor 39, in which the alternating current winding 29 of the saturating reactor 28 is inserted, to one energizing terminal of a Wheatstone bridge network 40 and the other end of the transformer secondary winding 16 is connected by a conductor 41 to the remaining bridge energizing terminal. As will be later described the saturating reactor 28 is adapted to control the flow of energizing current to the bridge network 40 from the transformer secondary winding 16.

The bridge network 40 includes the lamp 4 in one arm, a fixed resistor 42 in another arm and fixed resistances 43 and 44 in the remaining arms. A slidewire resistor 45 is connected between the last mentioned resistances and it will be noted more or less of the resistor 45 is adapted to be placed into or taken out of the bridge arms including the resistors 43 and 44 as a contact 46 is moved along the slidewire resistor 45. The equalizing or balancing terminals of the bridge 40 are connected by conductors 47 and 48 to the terminals of the primary winding 49 of the transformer 50, the secondary winding 51 of which is connected to the input circuit of an electronic valve 52. The electronic valve 52 is a heater type triode and includes an anode 53, a cathode 54, a heater filament 55 and a control grid 56. The heater filament 55 is connected by conductors 35 and 36 to the transformer secondary winding 13 and receives energizing current therefrom. One winding 57 of a two-phase reversible electrical motor 58 is included in the output circuit of valve 52 and the other motor winding 59 is connected to the alternating current supply conductors L¹ and L² through a suitable condenser 60.

Anode voltage is supplied to valve 52 from a battery 61 but it will be understood the output of a suitable rectifier energized from an alternating current source may be employed in lieu of battery 61 if desired. The current flow through the valve 52 is normally maintained at a mean value due to the action of a cathode biasing resistor 62 which, as shown, is shunted by a condenser 63. When the current flow through the bridge equalizing conductors 47 and 48 is zero in value, the pulsations in the current flow through the motor winding 57 will be negligible and incapable of energizing the motor for rotation. When the bridge 40 becomes unbalanced, however, alternating currents in phase with or 180° out of phase with the alternating current supplied by conductors L¹ and L² will flow through the bridge equalizing conductors 47 and 48 to thereby energize the transformer 50, and as a result, pulsating direct current of a corresponding phase will flow through the motor winding 57. Due to the action of condenser 60 the current flow through the motor winding 59 will lead the alternating current supplied by conductors L¹ and L² by approximately 90° so that, when the winding 57 is so energized by pulsating direct currents in phase with or 180° out of phase with said alternating supply current, the magnetic fields set up by these windings will be displaced by approximately 90° with the result that a rotating magnetic field will be set up in the motor in one direction or the other and the motor rotor will accordingly be actuated for rotation in a corresponding direction. Thus, depending upon the direction of unbalance of the bridge 40 the motor 58 will be energized for rotation in one direction or the other, and as will be apparent to those skilled in the art, the motor speed will be directly dependent upon the extent of unbalance of the bridge 40.

In operation the energizing current supplied to bridge 40 is adapted to be varied in accordance with the illumination of photoelectric cell 1 by an arrangement including the saturating reactor 28 so that the intensity of illumination of lamp 4 will be varied in the proper direction to restore the balance of illumination of the two photoelectric cells. When light from the furnace 2 is focussed on photoelectric cell 1, the electron emission from the cathode of this unit accordingly increases to thereby render the control grid 34 of the electronic valve 31 less negative with respect to the potential of the cathode 32. This operates to increase the conductivity of the valve 31 and thereby produces an increase in the current flow to the direct current winding 27 of the saturating reactor 28. The consequent reduction in impedance of the alternating current winding 29 of the reactor 28 results in an increase in the energizing current supplied to the bridge network 40 and thereby the illumination of lamp 4 is changed sufficiently to restore the balance of illumination on the two photoelectric cells.

When photoelectric cells of the vacuum type are employed this balance of illumination will be exact to a relatively high degree of precision by virtue of the fact that when the voltage across the photoelectric cells is high enough to drive all of the electrons from the cathode to the anode the current conducted by the photoelectric cells will be constant for all higher voltages. Accordingly, only a negligibly small unbalance of illumination will be sufficient to swing grid 34 of valve 31 to any degree of bias that may be necessary to restore the balance of illumination.

It will be apparent that when the energizing current supplied the bridge network 40 is varied, the current flow through the lamp 4 and thereby the illumination of the lamp is varied. It should be noted, however, that the voltage drops through the bridge arms including the resistances 42, 43, 44 and 45 bear a straight line relationship to the current flow therethrough but that no such straight line relationship obtains for the lamp 4 because, as the lamp current is increased, the filament temperature thereof is raised and because of the temperature coefficient of resistance possessed by the filament the voltage drop thereacross increases at a different rate than does the current. For example, tungsten lamps have a positive coefficient of resistance and carbon lamps have a negative coefficient of resistance. Either type of lamp may be employed in the bridge 40 but I have found it desirable to use a carbon lamp. It will then be apparent that when the energizing current supplied to the bridge 40 is changed the bridge will be unbalanced in one direction or the other and to an extent corresponding with the magnitude of the change, and accordingly, a pulsating electromotive force in phase with or 180° out of phase with the line voltage will appear across the equalizing terminals of the bridge.

This pulsating voltage is impressed on the primary winding 49 of the transformer 50, the secondary winding 51 of which is connected to the input circuit of valve 52 so that the latter is alternately rendered more conductive and less conductive at a frequency corresponding to the supply line frequency, and accordingly pulsating direct current in phase with or 180° out of phase with the supply line voltage will be impressed on the motor winding 57 resulting in selective energization of the motor for rotation in one direction or the other. Thus, depending on the change in value of light falling on the photoelectric cell 1 the motor will be selectively energized for rotation in one direction or the other and it is noted the motor speed will be directly dependent upon the extent of such change.

As shown in Fig. 1, the shaft of motor 58 is connected in any convenient manner to a shaft 64 which may desirably be a rod having a spiral groove thereon and the bridge rebalancing contact 46 is mounted on a carriage carried by the shaft 64 and is arranged to be moved in one direction or the other as the shaft 64 is rotated. Thus, when the motor 58 is energized for rotation as a result of a change in the resistance of lamp 4, the motor effects an adjusting movement of the contact 46 along the slidewire resistor 45 in the proper direction to rebalance the bridge network 40. When the bridge network 40 is rebalanced the motor will come to rest with the contact 46 at a new position along the slidewire resistor 45 which position will then be a measure of the value of the illumination on the photoelectric cell 1 and thereby of the temperature of the material in the furnace 2.

Desirably, a pen mounted on the carriage which carries the bridge rebalancing contact 46 is arranged to cooperate with a recorder chart 65 and to thereby provide a continuous record of the temperature of the material in furnace 2. The recorder chart is arranged to be driven by a continuously rotating roller 66 and the latter is driven in any convenient manner as, for example, by a unidirectional motor 67 through suitable gearing 68 so that a record of the temperature of the material in furnace 2 will be had as a continuous line on the chart.

In Fig. 2 I have illustrated more or less diagrammatically a modification of the arrangement shown in Fig. 1 wherein the photoelectric cell 3 has been dispensed with and a fixed resistor 3A utilized in lieu thereof. In this modified embodiment of my invention the point of engagement of the conductor 37 and the voltage divider 6 may be made adjustable and movable relatively thereto for rebalancing purposes in lieu of rebalancing by movement of the contact 46 relatively to the slidewire resistor 45. With this alternative arrangement, the contact 46 may desirably be fixed at an intermediate position along the slidewire resistor 45 and the contact 37A, the point of engagement of conductor 37 with the voltage divider 6, may be moved relatively to the voltage divider 6 by the motor 58.

By proper adjustment of contact 46 along resistor 45 of the bridge network 40, it will be apparent that for each value of illumination of the photoelectric cell 1 there will be a corresponding position of the contact 37A along the divider 6 at which the potential of the control grid 34 of valve 31 relatively to the cathode 32 will be that required to maintain the supply of energizing current to the bridge network 40 constant and at the value at which the bridge unbalanced current in the equalizing conductors 47 and 48 will be zero.

Upon departure of the illumination on photoelectric cell 1 from a balanced condition, for example, upon an increase in the illumination, the potential on the control grid 34 of the electronic valve 31 will be made less negative relative to the potential of cathode 32, and as a result, the conductivity of the valve 31 will be increased and the flow of current through the direct current winding 27 of the saturating reactor 26 will be increased to a corresponding extent. Such increase in the flow of current through the direct current winding of the saturating reactor 28 results in a corresponding decrease in the resistance presented by the alternating current winding 29 of the reactor resulting in an increase in the supply of energizing current to the bridge network 40. This increase in energizing current causes an unbalanced alternating voltage to appear in the equalizing conductors 47 and 48 as hereinbefore explained, which unbalanced voltage is amplified by the transformer 50 and valve 52 and applied to one phase winding 57 of motor 58. The motor windings are so arranged that the resulting rotation of the motor will be in the proper direction to adjust the contact 37A in an upward direction along the voltage divider 6 to restore the normal balanced potential relation of the control grid 34 and cathode 32 of valve 31. The motor energizing current will then be reduced to zero and subsequently the motor will come to rest.

It will be apparent a chart 65 may be arranged in cooperative relation with the voltage divider 6 and a pen may be mounted on the carriage which carries the rebalancing contact 37A for recording the variations in illumination on the photoelectric cell 1. It is noted that in order to have the pen travel the entire width of the chart the pen should be able to reach the edges of the chart without embracing the entire section of the voltage divider 6 between the conductors 7 and 8. This end may conveniently be attained in practice by inserting a resistor 6A of suitable value in series with the section of the voltage divider 6 between the conductors 7 and 8 as illustrated.

In Fig. 3 I have illustrated more or less diagrammatically another modification of the arrangement shown in Fig. 1 wherein the photoelectric cell 3 has been replaced by a resistor 3B and the point of engagement between the conductor 38 and the resistor 3B may be made adjustable for rebalancing purposes. With this alternative arrangement it will be clear that for each value of the illumination on the photoelectric cell 1 there will be a corresponding position of the point of engagement of the conductor 38 and the resistor 3B at which the potential relation between the control grid 34 and the cathode 32 of valve 31 is such that the motor 58 will be deenergized and upon a change in the illumination on photoelectric cell 1 the potential relation between the control grid 34 and cathode 32 will be varied to cause energization of the motor 58 for rotation in the proper direction to adjust the point of engagement of conductor 38 and resistor 3B as required to restore this normal potential relation and thereby to deenergize the motor 58.

It will be apparent that motor 58 may be utilized to operate a control valve or a rheostat for governing the application of an agent to a furnace for producing heat, for example, to the radiant energy of which the photoelectric cell 1 is responsive, or another motor desirably operated together with the motor 58 may be so employed. For example, as shown in Fig. 4, a furnace 2, to the radiant energy of which the photoelectric cell 1 is responsive, is heated by a resistor 69 which is connected to electric supply conductors $L^3$ and $L^4$ through a rheostat 70, the adjustment of which is effected by a motor 71. The motor 71 may be exactly like the motor 58, and in Fig. 4 is shown as having one phase winding connected in parallel with the phase winding 57 of motor 58 which is connected in the output circuit of the electronic valve 52, and the other phase winding is connected through a condenser 72 to the supply lines $L^1$ and $L^2$. The mechanical connection of the rheostat 70 to the motor 71 is such as to increase and decrease the supply of electric current to the resistor 69 as the radiant energy to which the photoelectric cell 1 is responsive drops below or rises above a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. An electrical control circuit comprising an adjustable circuit, means responsive to a change in a condition for unbalancing said circuit in one of two senses, saturable core means provided with an impedance winding and a saturating winding, means for deriving from said circuit in response to said unbalance condition electrical energy variable in characteristic dependent upon the sense of the unbalance, means for variably affecting the saturating winding from said derived energy for rendering said saturable core means responsive in accordance with the characteristic of the energy, means separate from said unbalancing means for adjusting said adjustable circuit irrespective of the value of the condition, and means coupling said impedance winding to said adjusting means for restoring said circuit to balance.

2. In a control arrangement, a balanceable circuit, means responsive to a change in a condition for unbalancing said circuit, means for deriving a direct current potential from said circuit with a polarity dependent upon the direction of departure from balance, comprising a magnetic amplifier means having alternating current impedance windings and direct current windings continuously responsive to said derived direct current potential for rendering the impedance of said impedance windings differently effective, and means separate from said unbalancing means and operated in response to the effective condition of said alternating current impedance windings upon unbalancing of said balanceable circuit for restoring said circuit balance irrespective of the value of the condition.

3. A control circuit comprising, a normally balanced electrical circuit, variable means associated with said balanced circuit for producing an unbalanced condition thereof in either of two directions, means for deriving a direct current potential in response to said unbalance having a characteristic variably dependent upon the direction of unbalance, rebalancing means separate from said unbalancing means and coupled to said balanced circuit for restoring said circuit to balance independently of the state of the variable unbalancing means, and means for controlling said rebalancing means, comprising saturable core means provided with a saturating winding and an alternating current impedance winding, means for continuously controlling current through said saturating winding in response to the direct current potential derived from said balanced circuit, energization of said saturating winding varying the effectiveness of said alternating current impedance winding, and a control connection between said alternating current impedance winding and said rebalancing means whereby said restoring operation is rendered effective.

4. An electrical control circuit comprising an adjustable normally balanced circuit arrangement, means responsive to a change in a condition for unbalancing said circuit in one of two senses, saturable core means provided with an alternating current impedance winding and a direct current saturating winding, means for deriving from said circuit in response to said unbalance condition electrical energy variable in polarity dependent upon the sense of the unbalance, means for variably affecting the direct current saturating winding from said derived energy for rendering said saturable core means responsive in accordance with the polarity of the energy, means separate from said unbalancing means for adjusting the balance of said normally balanced circuit irrespective of the value of the condition, and means coupling said alternating current winding to said adjusting means for restoring said circuit to balance.

5. A control circuit comprising an adjustable, normally balanced electrical circuit, an impedance device connected in said circuit and adapted to be adjusted in magnitude for producing an unbalanced condition of said circuit in either of two directions, means variable in accordance with changes in a variable condition under measurement to adjust said impedance device, a rebalancing device including an impedance device separate from said first mentioned impedance device connected into said balanced circuit for restoring said circuit to balance on unbalance thereof irrespective of the value of the condition, and means for controlling said rebalancing device, comprising saturable core means having a magnetic core structure on which is wound a direct current saturating winding and an alternating current impedance winding, means for supplying direct current to said saturating winding under control of the unbalance of said normally balanced circuit and variable in magnitude in accordance with the extent of said unbalance, energization of said saturating winding varying the impedance of said alternating current impedance winding, and an electrically conductive connection between said alternating current impedance winding and said rebalancing device for restoring said circuit to balance.

6. An electrical control system comprising a normally stabilized adjustable circuit, means responsive to a change in a variable condition for producing an unstabilized condition thereof in one of two senses, saturable core means provided with an impedance winding and a saturating winding, means for deriving from said circuit in response to said unstabilized condition electrical energy variable in characteristic dependent upon the sense in and extent to which said circuit has been unstabilized, solely electrical means continuously controlled by said derived energy for graduatingly supplying electrical energy to the saturating winding in accordance with the sense of and in proportion to the unstabilization of said adjustable circuit, and means separate from said unstabilizing means and operative irrespective of the value of the variable condition and controlled by said impedance winding for restoring the adjustable circuit to a stabilized condition following unstabilization thereof.

7. An electrical control system comprising a normally stabilized adjustable circuit, means responsive to a change in a variable condition for producing an unstabilized condition thereof in one of two senses, saturable core means provided with an alternating current impedance winding and a unidirectional current saturating winding, means for deriving from said circuit in response to said unstabilized condition a direct current potential variable in characteristic dependent upon the sense in and extent to which said circuit has been unstabilized, solely electrical means continuously controlled by said derived direct current potential for graduatingly supplying unidirectional current to the saturating winding in accordance with the sense of and in proportion to the unstabilization of said adjustable circuit, and means separate from said unstabilizing means and operative irrespective of the value of the variable condition and controlled by said impedance winding for restoring the adjustable circuit to a stabilized condition following unstabilization thereof.

8. An electrical control system comprising a normally stabilized adjustable circuit, an impedance variable in magnitude in accordance with a variable condition and connected into said circuit for producing an unstabilized condition of said circuit in either of two senses, saturable core means provided with an impedance winding and a saturating winding, means for deriving from said circuit in response to said unstabilized condition electrical energy variable in characteristic dependent upon the sense in and extent to which said circuit has been unstabilized, solely electrical means continuously controlled by said derived energy for graduatingly supplying electrical energy to the saturating winding in accordance with the sense of and in proportion to the unstabilization of said adjustable circuit, an impedance variable in magnitude and connected into said adjustable circuit, and means operative irrespective of the value of the variable condition and controlled by said impedance winding for varying said last mentioned impedance to restore the adjustable circuit to a stabilized condition following unstabilization thereof.

9. Photometric measuring apparatus including the combination of a light sensitive device responsive to change in magnitude of a variable condition, a second light sensitive device, an electric lamp arranged to illuminate said second light sensitive device, an alternating current voltage source and a direct current voltage source, a saturable core reactor having two windings, a Wheatstone bridge network including said lamp in one arm thereof and connected in circuit with said alternating current source and one of said saturable core reactor windings and adapted to be unbalanced in accordance with the sense and extent of the change in the lamp energizing current, means under control of said first mentioned light sensitive device connected in circuit with the other of said windings and said direct current source and adapted to control the flow of direct current through said winding and thereby the flow of energizing current to said lamp so that the illumination of said second mentioned light sensitive device is definitely related to that of the first mentioned light sensitive device, a slidewire resistor connected in another arm of said bridge network adapted to be adjusted to rebalance said bridge network, a reversible electrical motor adapted to adjust said slidewire resistor, and means responsive to said unbalance for continuously controlling said reversible electrical motor.

10. In a motor control system, an electrical motor, a variable control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means coupling said saturating winding, said control and follow-up impedances and electrical energizing means and operative to energize said saturating winding in accordance with the values of both said control impedance and said follow-up impedance, and means controlled by said output winding for controlling the energization of said motor.

11. In a motor control system, an electrical motor, a variable control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means coupling said saturating winding, said control and follow-up impedances and electrical energizing means and operative to energize said saturating winding in accordance with the values of both said control impedance and said follow-up impedance, and means including said output winding for energizing said motor.

12. In a motor control system, an electrical motor, a variable control impedance, a variable follow-up impedance, a balanced impedance network comprising said impedances, a saturable core amplifier having a magnetic core structure and output and saturating windings on said core structure, electrical energizing means, means coupling said saturating winding, said impedance network and said electrical energizing means in such a manner that the energization of said saturating winding is controlled by the amount of unbalance of said network, means controlled by said output winding for controlling the energization of said motor, and means operatively connected with said motor for varying the value of said follow-up impedance in a direction and to an extent to rebalance the impedance network.

13. In a motor control system, an electrical motor, a variable control impedance, condition responsive means for adjusting the value of said control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means coupling said saturating winding, said control and follow-up impedances and electrical energizing means and operative to energize said saturating winding in accordance with the values of both said control impedance and said follow-up impedance, and means controlled by said output winding for controlling the energization of said motor.

14. An electrical control system comprising a normally stabilized adjustable circuit, an impedance variable in magnitude in accordance with a variable condition and connected in said circuit for producing an unstabilized condition of said circuit in either of two senses, saturable core means provided with an impedance winding and a saturating winding, means for deriving from said circuit in response to said unstabilized condition electrical energy variable in characteristic dependent upon the sense in and extent to which said circuit has been unstabilized, solely electrical means continuously controlled by said derived energy for graduatingly supplying electrical energy to the saturating winding in accordance with the sense of and in proportion to the unstabilization of said adjustable circuit, an impedance variable in magnitude and connected into said adjustable circuit, mechanically operable driving means for varying said last mentioned impedance, and means having no movable parts coupling the driving means and the impedance winding and controlled by the impedance winding irrespective of the value of the variable condition for controlling the driving means to restore the adjustable circuit to a stabilized condition following unstabilization thereof.

15. An electrical control system comprising a normally stabilized adjustable circuit, an impedance variable in magnitude in accordance with a variable condition and connected in said circuit for producing an unstabilized condition of said circuit in either of two senses, saturable core means provided with an alternating current impedance winding and a unidirectional current saturating winding, means for deriving from said circuit in response to said unstabilized condition a direct current potential variable in characteristic dependent upon the sense in and extent to which said circuit has been unstabilized, solely electrical means continuously controlled by said derived direct current potential for graduatingly supplying unidirectional current to the saturating winding in accordance with the sense of and in proportion to the unstabilization of said adjustable circuit, an impedance variable in magnitude and connected into said adjustable circuit, a reversible electric motor for varying said last mentioned impedance, and means having no movable parts coupling the motor and the impedance winding and controlled by the impedance winding irrespective of the value of the variable condition for controlling the motor to restore the adjustable circuit to a stabilized condition following unstabilization thereof.

16. In a control system, an electrical control device, a variable control impedance, a variable follow-up impedance, means connecting said variable follow-up impedance to said control device and operative to vary the value of said impedance in accordance with an operating characteristic of said control device, a saturable core amplifier having a magnetic core structure and output and saturating windings on said core structure, means coupling said saturating winding, said control and follow-up impedances and electrical energizing means and operative to energize said saturating winding in accordance with the values of both said control impedance and said follow-up impedance, and means controlled by said output winding for controlling the energization of said control device.

17. In a control system, an electrical control device, a variable control impedance, a variable follow-up impedance, means connecting the variable follow-up impedance to said control device and operative to vary the value of said impedance in accordance with an operating characteristic of said control device, a saturable core amplifier having a magnetic core structure and output and saturating windings on said core structure, means coupling said saturating winding, said control and follow-up impedances and electrical energizing means and operative to energize said saturating winding in accordance with the values of both said control impedance and said follow-up impedance, and means including said output winding for energizing said control device.

18. In a control system, an electrical control device, a variable control impedance, a variable follow-up impedance, means connecting said variable follow-up impedance to said control device and operative to vary the value of said impedance in accordance with an operating characteristic of said control device, a balanced impedance network comprising said impedances, a saturable core amplifier having a magnetic core structure and output and saturating windings on said core structure, electrical energizing means, means coupling said saturating winding, said impedance network and said electrical energizing means in such a manner that energization of said saturating winding is controlled by the amount of unbalance of said network, and means controlled by said output winding for controlling the energization of said control device.

19. In a control system, an electrical control device, a variable control impedance, condition responsive means for adjusting the value of said control impedance, a variable follow-up impedance, means connecting said variable follow-up impedance to said control device and operative to vary the value of said impedance in accordance with an operating characteristic of said control device, a saturable core amplifier having a magnetic core structure and output and saturating windings on said core structure, means coupling said saturating winding, said control and follow-up impedances and electrical energizing means and operative to energize said saturating winding in accordance with the values of both said control impedance and said follow-up impedance, and means controlled by said output winding for controlling the energization of said control device.

20. A control circuit comprising, a normally balanced electrical circuit, means responsive to a condition and associated with said balanced circuit for producing an unbalanced condition thereof in either of two directions upon a change in said condition, means for deriving a direct current potential in response to said unbalance having a characteristic variably dependent upon the direction of unbalance, driving means coupled to said balanced circuit for restoring said circuit to balance irrespective of the value of the condition, and means for controlling said driving means, comprising saturable core means provided with a saturating winding and an alternating current impedance winding, means for continuously controlling current through said saturating winding in response to the direct current potential derived from said balanced circuit, energization of said saturating winding varying the effectiveness of said alternating current impedance winding, and a control connection between said alternating current impedance winding and said driving means whereby said restoring operation is rendered effective.

21. A control circuit comprising a normally balanced electrical circuit, an impedance device connected in said normally balanced circuit and adapted to be adjusted in magnitude for producing an unbalanced condition of said circuit in either of two senses, means associated with said balanced circuit and variable in accordance with changes in a condition under measurement to adjust said impedance device, means for deriving an electric potential from said normally balanced electrical circuit in response to said unbalance having a characteristic variably dependent upon the direction of unbalance, reversible motor means coupled to said balanced circuit for restoring said circuit to balance on unbalance thereof irrespective of the value of the condition and means for controlling said reversible motor means, comprising saturable core means provided with a direct current saturating winding and an alternating current impedance winding, means for continuously controlling direct current through said saturating winding in response to the potential derived from said balanced circuit, energization of said saturating winding varying the effectiveness of said alternating current impedance winding, and a control connection between said alternating current impedance winding and said reversible motor means whereby said rebalancing operation is rendered effective.

22. An electrical control system comprising a normally stabilized adjustable circuit, means responsive to a change in a variable condition for producing an unstabilized condition thereof in one of two senses, saturable core means provided with an impedance winding and a saturating winding, means for deriving from said circuit in response to said unstabilized condition electrical energy variable in characteristic dependent upon the sense in and extent to which said circuit has been unstabilized, solely electrical means continuously controlled by said derived energy for graduatingly supplying electrical energy to the saturating winding in accordance with the sense of and in proportion to the unstabilization of said adjustable circuit, mechanically operable driving means coupled to said adjustable circuit, and means having no movable parts coupling the driving means and the impedance winding and controlled by the impedance winding irrespective of the value of the variable condition for controlling the driving means to restore the adjustable circuit to a stabilized condition following unstabilization thereof.

23. An electrical control system comprising a normally stabilized adjustable circuit, means responsive to a change in a variable condition for producing an unstabilized condition thereof in one of two senses, saturable core means provided with an alternating current impedance winding and a unidirectional current saturating winding, means for deriving from said circuit in response to said unstabilized condition an electrical potential variable in characteristic dependent upon the sense in and extent to which said circuit has been unstabilized, solely electrical means continuously controlled by said derived electrical potential for graduatingly supplying unidirectional current to the saturating winding in accordance with the sense of and proportion to the unstabilization of said adjustable circuit, means coupled to said adjustable circuit for restoring said circuit to a stabilized condition, a reversible electric motor for operating the last mentioned means, and means having no movable parts coupling the motor and the impedance winding and controlled by the impedance winding irrespective of the value of the condition for controlling the motor to restore the circuit to a stabilized condition following unstabilization thereof.

24. An electrical control circuit comprising an adjustable circuit, means responsive to a change in a condition for unbalancing said circuit in one of two senses, saturable core means provided with an impedance winding and a saturating winding, means for deriving from said circuit in response to said unbalance condition electrical energy variable in characteristic dependent upon the sense of the unbalance, means for variably affecting the saturating winding from said derived energy for rendering said saturable core means responsive in accordance with the characteristic of the energy, mechanically movable means separate from said unbalancing means for adjusting said adjustable circuit irrespective of the value of the condition, and means for coupling said impedance winding to said adjusting means for restoring said circuit to balance.

25. An electrical control circuit comprising a balanceable circuit which is normally at a null condition of balance, means responsive to a change in a condition for unbalancing said circuit in one of two senses, saturable core means provided with an impedance winding and a saturating winding, means for deriving from said circuit in response to said unbalance condition a direct current potential variable in characteristic dependent upon the sense of the unbalance, means for variably affecting the saturating winding from said derived energy for rendering said saturable core means responsive in accordance with the characteristic of the direct current potential, means separate from said unbalancing means for adjusting said adjustable circuit irrespective of the value of the condition, and means for coupling said impedance winding to said adjusting means for restoring the null condition of balance of said circuit.

26. In a control arrangement, a balanceable circuit, means responsive to a change in a condition for unbalancing said circuit, means for deriving a direct current potential with a polarity dependent upon the direction of departure from balance comprising a magnetic amplifier means having alternating current impedance windings and direct current windings continuously responsive to said derived direct current potential for rendering the impedance of said impedance windings differently effective, and mechanically movable means separate from said unbalancing means and operated in response to the effective condition of said alternating current impedance windings upon unbalancing of said balanceable circuit for restoring said circuit balance irrespective of the value of the condition.

27. In a control arrangement, a balanceable circuit which is normally at a null condition of balance, means responsive to a change in a condition for unbalancing said circuit, means for deriving a direct current potential with a polarity dependent upon the direction of departure from balance comprising a magnetic amplifier means having alternating current impedance windings and direct current windings continuously responsive to said derived direct current potential for rendering the impedance of said impedance windings differently effective, and means separate from said unbalancing means and operated in response to the effective condition of said alternating current impedance windings upon unbalancing of said balanceable circuit for restoring the null condition of balance of said circuit irrespective of the value of the condition.

THOMAS R. HARRISON.